(12) United States Patent
Kwint et al.

(10) Patent No.: US 11,204,477 B2
(45) Date of Patent: Dec. 21, 2021

(54) METHOD FOR HIGH SPEED STRANDING OF ARAMID YARNS

(71) Applicant: TEIJIN ARAMID B.V., Arnhem (NL)

(72) Inventors: Huibert Kwint, Veenendaal (NL); Douwe Dros, Brummen (NL); Hendrik Swierenga, Nijmegen (NL); Sonja Sas, Huissen (NL)

(73) Assignee: TEIJIN ARAMID B.V., Arnhem (NL)

( * ) Notice: Subject to any disclaimer, the term of this patent is extended or adjusted under 35 U.S.C. 154(b) by 296 days.

(21) Appl. No.: 14/774,409

(22) PCT Filed: Mar. 13, 2014

(86) PCT No.: PCT/EP2014/054989
§ 371 (c)(1),
(2) Date: Sep. 10, 2015

(87) PCT Pub. No.: WO2014/140194
PCT Pub. Date: Sep. 18, 2014

(65) Prior Publication Data
US 2016/0025947 A1  Jan. 28, 2016

(30) Foreign Application Priority Data

Mar. 15, 2013 (EP) .................................... 13159483

(51) Int. Cl.
*G02B 6/44* (2006.01)
*D06M 13/282* (2006.01)
(Continued)

(52) U.S. Cl.
CPC .......... *G02B 6/4486* (2013.01); *D02G 3/047* (2013.01); *D02G 3/36* (2013.01); *D06M 13/282* (2013.01);
(Continued)

(58) Field of Classification Search
CPC .................................. D07B 1/162; D07B 3/02
See application file for complete search history.

(56) References Cited

U.S. PATENT DOCUMENTS

| | | | | |
|---|---|---|---|---|
| 4,816,336 A | * | 3/1989 | Allou, Jr. | ............ D06M 13/292 252/8.84 |
| 5,139,873 A | * | 8/1992 | Rebouillat | .............. D06M 7/00 252/8.61 |

(Continued)

FOREIGN PATENT DOCUMENTS

| CN | 101057023 A | 10/2007 |
|---|---|---|
| EP | 0 985 066 B1 * | 2/2003 |

(Continued)

OTHER PUBLICATIONS

Roblon Server SE-18 / SE-24 v3.2, , Jan. 30, 2011 (Jan. 30, 2011), XP055084665, Frederikshavn, Denmark Retrieved from the Internet: <URL:http://www.roblon.com/download/CABLE/se18_se24_server.pdf> [retrieved on Oct. 21, 2013].

(Continued)

*Primary Examiner* — Matthew J Daniels
*Assistant Examiner* — Mohammad M Ameen
(74) *Attorney, Agent, or Firm* — Oliff PLC

(57) ABSTRACT

A method for stranding aramid yarn around an endless core includes a stranding step that involves a stranding apparatus having at least one yarn bobbin. The bobbin revolves around its own axis and the bobbin revolves around the core, wherein the yarn unwinds from the bobbin and winds around the core. The yarn is a continuous aramid yarn provided with 0.05 to 0.95 wt %, based on the weight of the aramid, of a finish including an organophosphorus compound. The organophosphorus compound is a compound of the formula X1X2X3P=O. X1, X2, and X3 are independently selected from Y1-, Y1-O—, and M-O. Y1 is a branched or straight-chain C1-C20 alkyl, aryl or alkenyl. M is selected from Li, (Continued)

Figure 1:
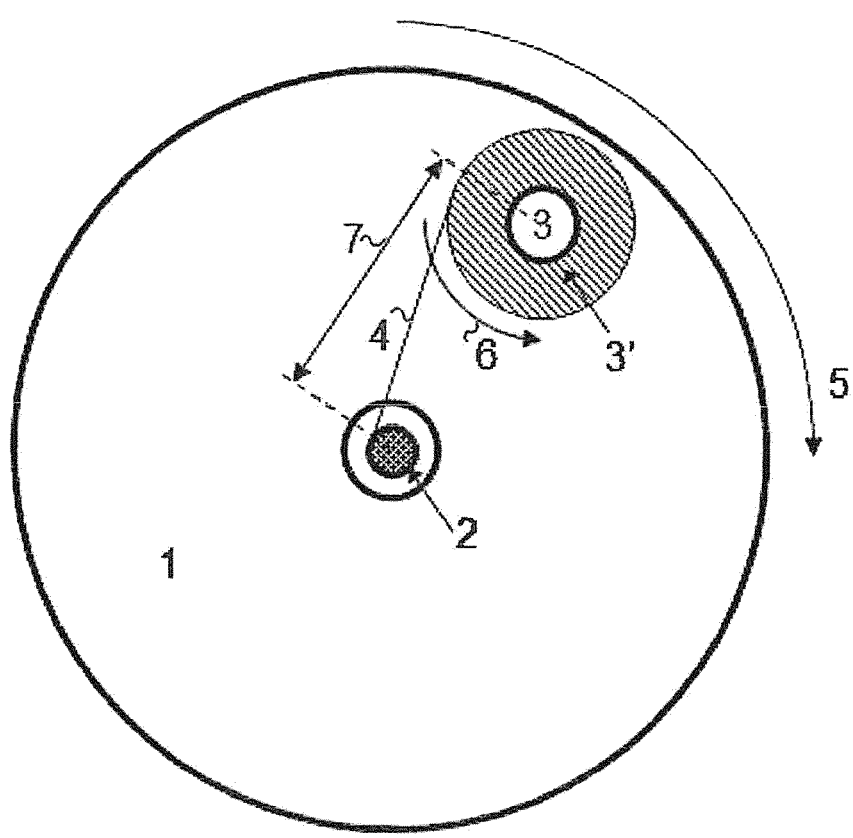

Na, K, or ammonium. At least one of X1, X2, or X3 is selected from Y1- or Y1-O—.

24 Claims, 2 Drawing Sheets

(51) Int. Cl.
*D07B 3/06* (2006.01)
*D07B 1/14* (2006.01)
*D02G 3/04* (2006.01)
*D02G 3/36* (2006.01)
*D07B 1/02* (2006.01)

(52) U.S. Cl.
CPC .............. *D07B 1/147* (2013.01); *D07B 3/06* (2013.01); *G02B 6/4432* (2013.01); *D07B 1/025* (2013.01); *D07B 2201/2012* (2013.01); *D07B 2201/2089* (2013.01); *D07B 2201/2096* (2013.01); *D07B 2205/3057* (2013.01); *D07B 2401/207* (2013.01)

(56) References Cited

U.S. PATENT DOCUMENTS

| | | | |
|---|---|---|---|
| 5,766,746 A * | 6/1998 | Kampl | D04H 1/4342 428/219 |
| 7,799,239 B2 | 9/2010 | Shigeno et al. | |
| 2004/0190841 A1 | 9/2004 | Anderson et al. | |
| 2005/0049339 A1 * | 3/2005 | Knop | C08K 5/34922 524/115 |
| 2006/0105168 A1 | 5/2006 | Willemsen et al. | |
| 2009/0285537 A1 | 11/2009 | Willemsen et al. | |
| 2011/0100415 A1 * | 5/2011 | Osamura | B32B 37/12 136/244 |
| 2011/0142403 A1 * | 6/2011 | Hurley | B29D 11/00663 385/102 |

FOREIGN PATENT DOCUMENTS

| | | |
|---|---|---|
| EP | 1 808 526 A1 | 7/2007 |
| JP | 2012-188776 A | 10/2012 |
| WO | 2004/061196 A1 | 7/2004 |
| WO | 2005/078498 A1 | 8/2005 |
| WO | 2008/000371 A1 | 1/2008 |

OTHER PUBLICATIONS

Jun. 23, 2014 International Search Report issued in International Application No. PCT/EP2014/054989.

Jun. 23, 2014 Written Opinion issued in International Application No. PCT/EP2014/054989.

Mar. 20, 2017 Office Action issued in Chinese Patent Application No. 201480012977.3.

* cited by examiner

METHOD FOR HIGH SPEED STRANDING OF ARAMID YARNS

In the production of fiber optic cables for indoor as well as outdoor applications, continuous multi-filament aramid yarns are applied via stranding around an optical cable center or core, generally at very accurate tension control. This stranding process may be carried out by providing an endless core to a stranding apparatus comprising at least one yarn bobbin provided onto a disk, wherein during operation the bobbin rotates around its own axis, with the disk rotating around its own axis, resulting in the bobbin rotating around the core, and unwinding the yarn from the bobbin around the core to provide a core surrounded by the yarn. Apparatus of this type is often indicated as a server. Servers are commercially available from, e.g., Roblon, e.g., under the indications Roblon SE18 or SE24. In these servers, the yarn-take-off is rolling, which as opposed to systems wherein the bobbin does not rotate around its own axis but is stationary. Where the bobbin is stationary, the yarn-take-off from the bobbin is "over the top" of the bobbin. Servers may be integrated into the Optical Fiber Cable (OFC) production lines and if so desired tandemized with the subsequent process where a polymer outer layer, also indicated as sheath, is provided onto the core provided with aramid yarn. However, aramid yarn stranding can be done as stand-alone process as well.

The speed determining step of the OFC production line is generally the rotation speed of the server. The rotation speed of the server is typically determined by the package stability: that is, the ability of the yarn package to withstand the forces caused by the rotation speed of the server. Within the present specification, a bobbin is a tube, spool or reel on which aramid yarn is wound. The yarn wound on the bobbin is indicated as the yarn package. At high rotating speeds, deformation of the aramid yarn packages occurs, resulting in shifting-off of the yarn layers on the tube. When this happens, take-off of the yarn is no longer possible. This phenomenon is often limiting the production speed of the OFC production line. While the mechanical limitations of the server are typically 250-300 RPM (revolutions per minute), insufficient package stability makes it necessary to limit the speed of the server, e.g., to a value of 150 RPM. An improvement of package stability will result in increased production speeds and reduced operating costs. There is therefore need for an aramid stranding process which can be operated at a higher operating speed. The present invention provides such a process.

The present invention is directed to a method for stranding aramid yarn around an endless core, wherein the core is provided for a stranding step to a stranding apparatus comprising at least one yarn bobbin, wherein during operation the bobbin revolves around its own axis and the bobbin revolves around the core, and unwinding the yarn from the bobbin around the core to provide a core surrounded by the yarn, wherein the yarn is a continuous aramid yarn provided with 0.05 to 0.95 wt %, based on the weight of the aramid, of a finish comprising an organophosphorus compound, wherein the organophosphorus compound is a compound of the formula X1X2X3P=O, wherein X1, X2, and X3 are independently selected from Y1-, Y1-O—, and M-O, wherein Y1 is a branched or straight-chain C1-C20 alkyl, aryl or alkenyl, with M being selected from Li, Na, K, or ammonium, with the proviso that at least one of X1, X2, or X3 is selected from Y1- or Y1-O—, wherein the different types of Y1 may be the same or different.

Surprisingly, it has been found that appliance of a minor amount, i.e., 0.05 to 0.95 wt %, based on the weight of the aramid, of a finish comprising a specific organophophorus compound on aramid yarn influences the frictional behavior between yarn-layers in a completely different way as compared to standard oil-based aramid finishes based on fatty acid esters, such as coconut oil and polyglycol. As a result, the package stability on a rotating server with a rolling yarn take-off is strongly improved. Consequently, packages of aramid yarns provided with this finish allow for high speed stranding of aramid yarn around an endless core. The aramid packages can be applied on any server standard used in the industry and thus will be able to increase the OFC line speed dramatically without compromising on quality. High production speeds will enhance the productivity of the OFC manufacturing process.

It is noted that WO2008/000371 describes an antitracking aramid yarn which may be used in ADDS cables. The aramid filament yarn described therein is provided with a finish composition comprising an organic substance, the amount of organic substance in the finish being selected so that the finish has a conductivity from 0.2 mS/cm to 200 mS/cm, measured as a 50 wt % finish composition in water at 20 DEG C, and the amount of the finish on the yarn being selected so that the yarn has a specific electric resistance from $4 \times 10^4$ to $1.2 \times 10^7$ Ohm.cm. The finish is used in an amount of 1-30 wt. %, in particular 8-22 wt. %. A large group of possible finish compounds with widely varying chemical compositions are described.

This reference does not disclose or suggest that use of a minor amount, 0.05 to 0.95 wt %, of a finish comprising a specific organophophorus compound in a specific method for stranding aramid yarn will lead to an improved package stability with resulting advantages in OFC production.

In the method of the invention a continuous aramid yarn is used which is provided with a finish comprising an organophosphorus compound. Single compounds or mixtures may be used. It is preferred for the organophosphorus compound to be an alkyl, aryl or alkenyl organo-phosphorous compound. It is more preferred for the organophosphorus compound to comprise an oxygen atom bonded through a double bond with the phosphorus atom.

The organophosphorus compound is a compound of the formula X1X2X3P=O, wherein X1, X2, and X3 are independently selected from Y1-, Y1-O—, and M-O, wherein Y1 is a branched or straight-chain $C_1$-$C_{20}$ alkyl, aryl or alkenyl, with M being selected from Li, Na, K, or ammonium, with the proviso that at least one of X1, X2, or X3 is selected from Y1- or Y1-O—, wherein the different types of Y1 may be the same or different.

In one embodiment, the finish comprises an organophosphorus compound which is a phosphine oxide according to formula 1 below, wherein R1, R2 and R3 are branched and/or or straight-chain $C_1$-$C_{20}$ alkyl, aryl or alkenyl.

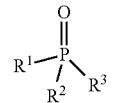

(formula 1)

In another embodiment, the finish comprises an organophosphorus compound which is a phosphinate according to formula 2 below, wherein R1 is branched or straight-chain $C_1$-$C_{20}$ alkyl, aryl or alkenyl, Li, Na, K or $NH_4$ and R2 and R3 are branched and/or straight-chain $C_1$-$C_{20}$ alkyl, aryl or alkenyl.

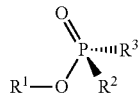

(formula 2)

In another embodiment, the finish comprises an organophosphorus compound which is a phosphonate according to formula 3 below, wherein R1 and R2 are branched and/or straight-chain $C_1$-$C_{20}$ alkyl, aryl or alkenyl, Li, Na, K or $NH_4$, and R3 is a branched and/or straight-chain $C_1$-$C_{20}$ alkyl, aryl or alkenyl.

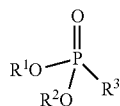

(formula 3)

In a further embodiment, the finish comprises an organophosphorus compound which is a phosphate ester according to formula 4 below, wherein R1 is branched or straight-chain $C_1$-$C_{20}$ alkyl, aryl, alkenyl, R2 and R3 are H, Li, Na, K or $NH_4$, or branched or straight-chain $C_1$-$C_{20}$ alkyl, aryl, or alkenyl.

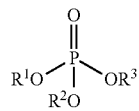

(formula 4)

In a preferred embodiment of the present invention, the continuous yarn comprises a finish comprising mono- or dialkyl phosphate ester or a mixture thereof, and wherein the mono- or dialkyl phosphate ester finish has the formula:

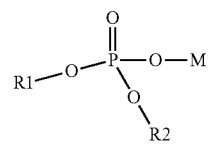

wherein R1 is branched or straight-chain $C_1$-$C_{15}$ alkyl, R2 is H, Li, Na, K or $NH_4$, or branched or straight-chain $C_1$-$C_{15}$ alkyl, and M is Li, Na, K or $NH_4$. In the alkyl phosphate ester used in this embodiment of the present invention, R1 is branched or straight-chain $C_1$-$C_{15}$ alkyl and R2 is H, Li, Na, K, or $NH_4$, or branched or straight-chain $C_1$-$C_{15}$ alkyl. To increase the solubility in water, it is preferred for R1 and/or R2 to be independently selected from branched or straight-chain $C_3$-$C_{15}$ alkyl groups, more preferably branched or straight-chain $C_4$-$C_{14}$, $C_6$-$C_{14}$, $C_8$-$C_{14}$, $C_6$-$C_{12}$, $C_8$-$C_{12}$ or $C_8$-$C_{10}$ alkyl groups. Alkyl phosphate esters wherein R1 and/or R2 are selected $C_4$, $C_6$, $C_8$, $C_{10}$ or $C_{12}$ alkyl are very useful. These alkyl groups may be branched or straight-chain, but straight-chain alkyl groups are usually preferred. Both groups R1 and R2 may be alkyl. It is also possible that R1 is an alkyl group and R2 is H, an alkali metal or ammonium. It is very useful to apply mixtures of mono- and dialkyl phosphate esters. A particularly useful alkyl phosphate ester has straight-chain $C_6$ or $C_{12}$ alkyl groups. This can be the mono-$C_6$ or $C_{12}$ alkyl ester or the dialkyl $C_6$ or $C_{12}$ ester, or a combination of straight-chain mono- and di-$C_6$ or $C_{12}$ alkyl groups. The use of the straight chain $C_{12}$ alkyl mono-ester, the straight chain $C_{12}$ alkyl di-ester, and combinations thereof are preferred. M is then preferably an alkali metal, most preferably K (potassium) to give a mixture of dipotassium mono-dodecyl phosphate ester and potassium didodecyl phosphate ester, i.e. for $C_{12}$ alkyl:

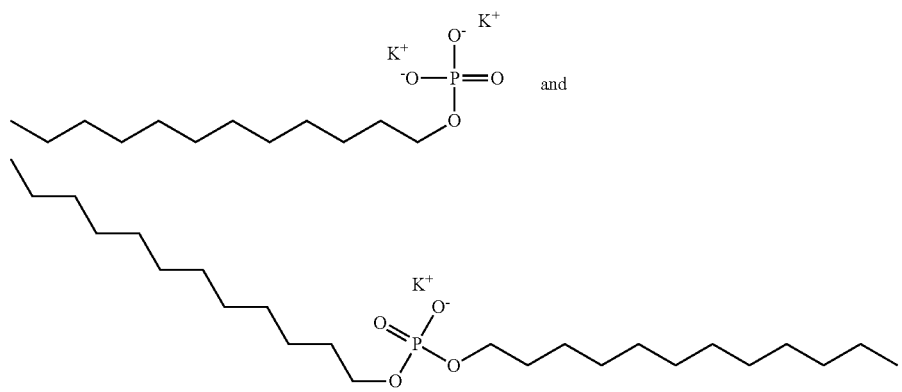

In all phosphate esters used in this invention M is Li, Na, K or NH$_4$, wherein Li, Na and K are alkali metals. K is most preferred as group M.

It should further be understood that alkyl alcohols with 6 to 15 carbon atoms are sometimes commercially available as mixtures having minor amounts of lower and higher alkyl alcohols. Such starting materials can be used for making the alkyl phosphate esters, which then also consist of a mixture of alkyl phosphate esters with higher and shorter alkyl group.

The preferred mono-alkyl phosphate ester can be (partially, up to about 30 wt %) present as its dimer, the dialkyl pyrophosphate ester with the formula:

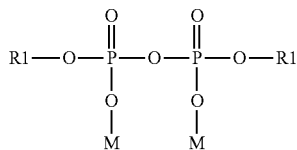

wherein R1 and M have the previously given meanings.

The finish comprising alkyl phosphate ester may further contain 0-20 wt % (more preferably 0-10 wt %) of the trialkyl phosphate ester of the formula:

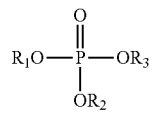

wherein $R_1$, $R_2$ and $R_3$ are independently branched or straight-chain $C_1$-$C_{15}$ alkyl groups. Preferably $R_3$ is the same as $R_1$ and/or $R_2$, and most preferred all groups $R_1$, $R_2$ and $R_3$ are the same. Preferred groups $R_1$, $R_2$ and $R_3$ are those as given above for the preferred embodiments of R1.

A very useful composition, for instance, is a mixture of 30-70 wt % mono-alkyl ester of phosphoric acid, 25-65 wt % dialkyl ester of phosphoric acid, 0-30 wt % dialkyl ester of pyrophosphoric acid, and 0-10 wt % trialkyl ester of phosphoric acid (to a total of 100 wt %), with the alkylesters being as described above. Examples of such compositions are for instance commercially available products such as Lurol A-45 (Goulston), Synthesin ARA® (Boehme), Leomin PN® (Clariant), Stantex ARA® (Pulcra Chemicals) and Lakeland PA800K® (Lakeland). Products LDP80 and LDP161 from Lakeland have also proven to be useful. These products have been analyzed using $^{31}$P-NMR and the corresponding composition (the mixture of mono-, di-, tri- and pyrophosphate ester) has been calculated and given in Table 1.

TABLE 1

Composition in percentage by weight
(obtained from $^{31}$P-NMR data)

| Product name | Supplier | Alkyl groups* | mono# | di# | tri# | pyro# |
|---|---|---|---|---|---|---|
| Lurol A45 | Goulston | hexyl (C6) | 45 | 54 | 1 | 0 |
| LDP161 | Lakeland | 2-ethylhexyl (C8) | 66 | 30 | 4 | 0 |
| LDP80 | Lakeland | decyl (C10) | 60 | 36 | 4 | 0 |
| Leomin PN | Clariant | lauryl (C12) | 37 | 56 | 0 | 7 |

TABLE 1-continued

Composition in percentage by weight
(obtained from $^{31}$P-NMR data)

| Product name | Supplier | Alkyl groups* | mono# | di# | tri# | pyro# |
|---|---|---|---|---|---|---|
| Synthesin ARA | Boehme | lauryl (C12) | 37 | 47 | 0 | 16 |
| Stantex ARA | Pulcra | lauryl (C12) | 38 | 47 | 0 | 15 |

*all alkyl groups of the phosphate esters are the same and are as indicated in this column.
mono, di, tri, and pyro stand for mono-alkyl ester of phosphoric acid, dialkyl ester of phosphoric acid, trialkyl ester of phosphoric acid, and dialkyl ester of pyrophosphoric acid, respectively.

The finish is present on the yarn in an amount in the range of 0.05 to 0.95 wt %, based on the weight of the aramid. In another embodiment 0.10 to 0.50 wt % of the finish is used.

The spin finish can be applied onto the yarn according to methods known to the skilled person. It can, e.g., be applied to dried yarn, to wet yarn, during yarn manufacture directly after the spinning of the filaments or during an aftertreatment. Application of the finish can be done by means of known methods and equipment, such as dipping, slit applicator, lick roller or spraying. The yarn is commonly brought in contact with the finish in a bath or by kiss rolls or slit applicators. Typical yarn speeds are 10 to 700 m/min, more preferably 25-500 m/min. The textile preferably only contains the finished continuous aramid yarn, but may in addition also contain other non-aramid yarns.

Aramid yarn, preferably is para-aramid yarn such as poly(p-phenylene terephthalamide), which is known as PPTA and commercially available as Twaron® or Kevlar®, or poly(p-phenyleneterephthalamide) containing 3,4'-diaminodiphenylether units (to give a yarn commercially available as Technora®), or aramids containing 5(6)-amino-2-(p-amino-phenyl)benzimidazole (DAPBI) units, to give e.g. a yarn known under the name Rusar®. In Technora® and Rusar® the 3,4'-diaminodiphenylether and DAPBI monomers replace part of the para-phenylenediamine (PPD) monomers during the polymerization of the PPD and TDC (terephthaloyldichloride) monomers.

The aramid yarns used in the present invention are notable for excellent di-electric and mechanical properties, such as high breaking strength and initial modulus, low breaking extensions, low creep, and a negative thermal expansion coefficient, and also for the abovementioned favorable applications and further processing properties. The cross section of the individual filaments of the yarns of the present invention can be optional, for example triangular or flat, or in particular elliptical or circular. In one embodiment, the aramid yarn is a high-modulus aramid yarn, e.g., with a modulus in the range of 100-150 GPa. These yarns can e.g., be obtained by applying a high yarn tension and high drying temperature in yarn manufacture.

In the process according to the invention aramid yarn is stranded around an endless core by a process wherein the core is provided to a stranding apparatus comprising at least one yarn bobbin, wherein during operation the bobbin revolves around its own axis and the bobbin revolves around the core, and the yarn is unwound from the bobbin around the core to provide a core surrounded by the yarn.

Preferably the bobbin is pivotable connected to a pivotable server disk and revolves around the cable core during a pivoting movement of the server disk. Preferably the server disk is pivotable arranged around the cable core. Preferably the cable core runs through the rotation axis of the server disk. Due to this the bobbin revolves around its own axis and the bobbin revolves around the cable core.

In a preferred embodiment bobbin and server disk are counter-rotating elements, this means that the rotation direction of the bobbin is reverse to the rotation direction of the server disk. In another embodiment co-rotation of the elements is applied, as this is possible as well.

A typical field of application of the invention is the use of high-modulus aramid yarn for spiraled reinforcement of optical fiber cables. Optical fiber cables are typically reinforced by stranding the aramid reinforcement from a server around the optical core. The high strength and modulus of aramid fibers protect the optical glass fibers in the cable against too high deformation arising from being subjected to external forces e.g. during installation of the cable and/or arising from wind and ice loads in use. Too high deformation of optical glass fibers results in decreased data transmission or, even worse, damage to and in extreme situations breakage of the optical glass fiber. Usually the optical glass fibers are located in thin thermoplastic hollow tubes in the cable (so-called central and loose tube cable designs). The optical fibers are often stranded around a central strength member, which is, e.g., a (glass) fiber reinforced rod ((G)FRP). Generally, a binder yarn or tape is wrapped around the optical fibers in the tubes. Regularly, an inner sheath is applied surrounding the optical core. Generally, the inner cable is completely covered by the reinforcing aramid fibers.

Another important characteristic of aramid fibers is their excellent heat resistance. During the production of the optical fiber cable, a thermoplastic jacket or sheathing is extruded around the inner cable to protect against weathering. The aramid fibers are located in between the jacket and the tubes thus forming an insulating reinforcement layer.

Within the context of the present specification the core to be provided with the aramid yarn comprises optical glass fibers and optional further elements such as one or more of a central strength member, fillers, sheaths, tubes etc. The core used in the process according to the invention thus generally comprises one or more optical glass fibers, whether or not surrounded by a sheathing, e.g., of a thermoplastic material, and whether or not comprising other elements such as a central strength member or further materials. The structure of these cores is known in the art.

If so desired, in the process according to the invention an extruder may be provided after the stranding apparatus, wherein the core provided with strands of aramid yarn is provided to an extrusion apparatus, where a sheathing of a polymer material is extruded around the core provided with strands of aramid yarn. A suitable extrusion material is polyethylene. Extrusion of sheaths around optical fiber cables provided with an aramid fiber layer is known in the art and does not require further elucidation.

In the stranding step at least one yarn bobbin revolves around the core. Preferably, an even number of bobbins is used in the stranding step, to prevent balancing issues in the apparatus. The number of bobbins is not critical to the process according to the invention. It may, e.g., range from 4 to 24 bobbins.

The bobbins revolve around they own axis, and around the core. Revolving the bobbins around the core may, e.g., be effected by the bobbins being provided onto a rotating disc.

The process according to the invention may be carried out to ensure a certain lay length, defined as the longitudinal distance along the cable required for one complete helical wrap, or in other words the total cable length divided by the total number of wraps. The lay length is determined by the speed with which the core is processed through the apparatus, and the rotating speed of the server. Suitable lay lengths may, e.g., be in the range of 100 mm to 500 mm, in particular 150 mm to 400 mm, more specifically 300 to 400 mm.

In the method according to the invention the stranding step may, e.g., be operated at a speed of at least 150 RPM, in particular at least 180 RPM, more in particular at least 200 RPM, or even at least 250 RPM. Speeds below 150 RPM are of course also possible, but less preferred. In some embodiments of the present invention the maximum speed is determined by the mechanical limitations of the server rather than by the package stability. The speed mentioned in this paragraph is the rotation speed of the disk.

The line speed of the process according to the invention is dependent on the lay length. For a lay length in the range of 300-400 mm, a suitable line speed may, e.g., be at least 60 m/min. The present invention allows the use of even higher line speeds, for this lay length, e.g., at least 65 m/min, preferably at least 70 m/min, or even at least 75 m/min. Speeds of at least 80 m/min, or even at least 85 m/min may be possible.

Suitable stranding apparatus is known in the art, and commercially available from various manufacturers, including Roblon, Tensor, Swisscap, and others.

The invention also pertains to an optical fiber cable comprising a core provided with stranded continuous aramid yarn, wherein the yarn is provided with a finish comprising an organophosphorus compound. For further information on the aramid yarn and the finish, the lay length, etc., reference is made to what is stated above.

In general in the present invention, aramid is provided to the core in an amount of 4-80 kg/km. For lighter cables, this amount may, e.g., be in the range of 4-15 kg/km, in particular 7-12 kg/km, more specifically 8-10 kg/km. For heavy cables which are subjected to strong forces of e.g. wind or ice, the amount may, e.g., be in the range of 15-80 kg/km, in particular in the range of 15-50 kg/km, more in particular in the range of 0-30 kg/km.

Figure 2:
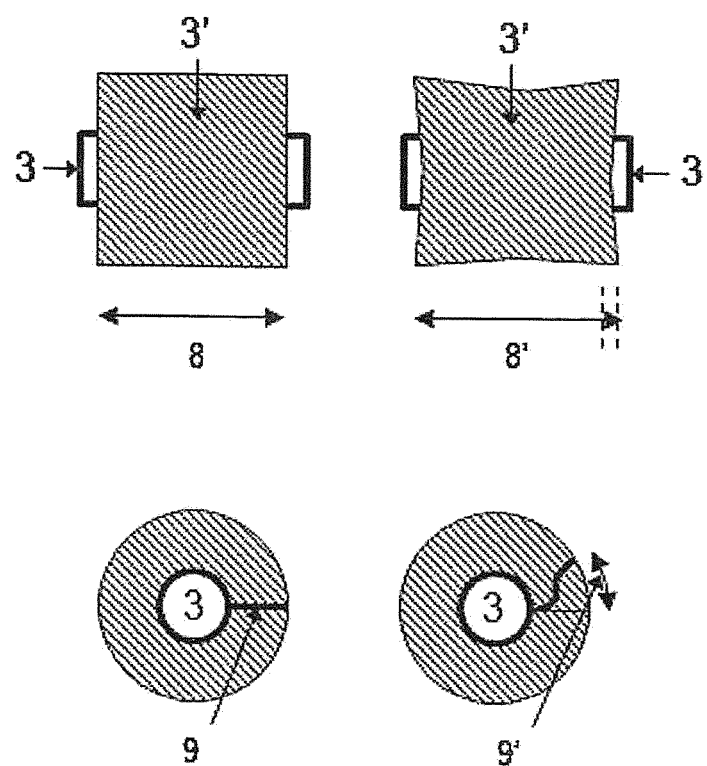

The invention is illustrated by FIG. 1, without being limited thereto or thereby. FIG. 2 illustrates a method for determining package stability, and will be discussed further in the example.

In FIG. 1 a server is shown, wherein the server has a server disk 1, an optical cable core 2 and a bobbin 3. Yarn is present on the bobbin 3 as yarn package 3'. As indicated above, the number of bobbins used in actual operation is generally higher, e.g., in the range of 4-24. The optical cable core 2 has an axis which runs perpendicular to the paper area and through the center of the optical cable core 2. The bobbin 3 has a rotation axis which runs perpendicular to the paper area. The yarn 4 from the yarn package 3' is transported to the optical cable core 2 by rolling yarn take-off. The server disk 1 has a rotation direction marked with the arrow 5. The bobbin 3 and also the yarn package 3' have a rotation direction marked with arrow 6, whereby server disk 1 and bobbin 3 are counter-rotating elements. A distance between the center of the bobbin 3 and the center of the optical cable core is marked with reference number 7.

In FIG. 1, server disk 1 and bobbin 3 are counter-rotating elements. It is also possible to operate the apparatus in such a manner that the disk and the core are co-rotating elements.

The invention is illustrated by the following examples, without being limited thereto or thereby.

Experimental:

Package Stability (Roblon Server Test)

Package stability is determined by paying-off the aramid yarn from the tube or bobbin it was wound on, on a rotating Roblon SE910-4 server with 116 cm disk-diameter. The center of yarn package to center of rotation distance is 51 cm. Reference is made to FIG. 1.

In one test set-up the rotation speed is increased with 15 RPM every two minutes. During the test the aramid yarn is unwound from the tube, by rolling yarn take-off. Deformation of the yarn package on the tube is measured as follows, with reference to FIG. 2.

In FIG. 2, the left-hand top picture is a side view of a bobbin 3 provided with yarn package 3'. The left-hand bottom picture is a top view of the same bobbin. The bobbin in these pictures is fresh, it has not been subjected to yarn roll-off. The width of the yarn package is indicated with arrow 8. Line 9 is a line between a mark on the tube and a mark on the top of the yarn package. On the fresh bobbin, the two marks are in alignment with the axis of the tube.

The right-hand pictures present the bobbin after it has been subjected to yarn roll-of. The width of the yarn package is indicated with arrow 8'. As can be seen from the Figure, the width 8' of the yarn package after yarn takeoff is larger than the width 8 of the fresh. The arrow 9' in the right-hand bottom figure indicates the shift of the mark on the yarn package from the original position, which was in alignment with the axis of the tube.

The procedure is repeated until either the maximum rotation speed of the Roblon server is achieved (250-300 rpm) or the increase of package width exceeds 20 mm and a safety stop is activated. The corresponding rotation speed is an indication of the quality of the package stability.

In another test set-up, a fixed rotation speed is applied and the total yarn package is being unwound. The maximum rotation speed at which the package can be paid-off without the security stop being activated, so where the increase of package width is smaller than 20 mm, is being determined. This procedure is highly similar to the actual processing of the aramid yarn packages in practice during the production of an Optical Fiber Cable.

EXAMPLE 1

A finish stock solution based on Stantex ARA® (10 wt %) was made by diluting Stantex ARA® (56 wt %; ex Pulcra) into a 10% solution in warm (40° C.) demi-water. To obtain the final spin finish solution (2.8 wt %) the Stantex ARA® stock solution was further diluted in warm demi-water (40° C.) and stirred for 15 minutes, after which it was ready to apply onto the yarn. Unfinished Twaron® multifilament yarn with a linear density of 2790 dtex and filament count 2000 produced in a single spinning trial at a spinning speed of 320 m/min and treated in-line with Stantex ARA® finish at a dosing level of 0.30 wt % using a slit applicator. The reference yarn sample was finished subsequently under the exact same spinning conditions with Breox 50A50® finish (consisting of random exthoxylated and propylated butanol, ex Ilco-Chemie, BASF) at 0.80 wt %. All samples are wound on a 290 mm length×106 mm outer diameter tube using a precision winder. The weight of the yarn packages and tube was 11 kg for the reference sample with Breox 50A50® and for the sample with Stantex ARA®. The density of the yarn packages was the same for the sample with Breox 50A50® and the sample with Stantex ARA®.

Package stability was measured according the above described Roblon server test set-up 1. The results are given in the following tables.

TABLE

| package width determination | | | | | |
|---|---|---|---|---|---|
| Server speed | Breox 50A50 ® 0.8 wt % (prior art) | | Stantex ARA ® 0.3 wt % (invention) | | relative Δwidth |
| setting RPM | width (mm) | Δwidth (mm) | width (mm) | Δwidth (mm) | decrease (%) |
| 0 (start) | 265.90 | 0 | 266.0 | 0 | |
| 145 | 267.70 | 1.80 | 266.25 | 0.25 | 86 |
| 160 | 269.65 | 3.75 | 266.40 | 0.40 | 89 |
| 175 | 273.15 | 7.25 | 266.85 | 0.85 | 88 |
| 190 | 279.55 | 16.65 | 267.10 | 1.10 | 92 |
| 205 | MAX* | MAX* | 267.60 | 1.60 | NAN* |
| 220 | MAX* | MAX* | 275.15 | 9.15 | NAN* |

MAX*: maximum package deformation of 20 mm was reached, safety stop activated,
NAN*: relative Δwidth decrease can not be calculated

TABLE

| Package angular rotation | | | |
|---|---|---|---|
| Server speed setting RPM | Breox 50A50 ® 0.8 wt % (prior art) Rotation (degrees) | Stantex ARA ® 0.3 wt % (invention) Rotation (degrees) | Relative angular rotation decrease (%) |
| 145 | 0 | 0 | |
| 160 | 3 | 0 | 100 |
| 175 | 15 | 0 | 100 |
| 190 | 38 | 0 | 100 |
| 205 | —* | 0 | NAN* |
| 220 | —* | 18 | NAN* |

*maximum package deformation of 20 mm was reached, safety stop activated,
NAN*: relative decrease in angular rotation can not be calculated

EXAMPLE 2

A finish stock solution based on Stantex ARA® (10 wt %) was made by diluting Stantex ARA® (56 wt %; ex Pulcra) into a 10% solution in warm (40° C.) demi-water. To obtain the final spin finish solution (2.8 wt %) the Stantex ARA® stock solution was further diluted in warm demi-water (40° C.) and stirred for 15 minutes, after which it was ready to apply onto the yarn. Unfinished Twaron® multifilament yarn with a linear density of 1610 dtex and filament count 1000 produced in a single spinning trial at a spinning speed of 400 m/min and treated in-line with Stantex ARA® finish at a dosing level of 0.20 wt % using a kiss roll. The reference yarn sample was finished subsequently under the exact same spinning conditions with Breox 50A50® finish (consisting of random exthoxylated and propylated butanol, ex Ilco-Chemie, BASF) at 0.80 wt %. All samples are wound on a 216 mm length tube with an outer diameter of 106 mm using a precision winder. The weight of the yarn packages and tube was 8.8 kg for both the reference sample with Breox 50A50® and the sample with Stantex ARA®. The density of the yarn packages was the same for the sample with Breox 50A50® and the sample with Stantex ARA®.

Package stability was measured according the above described Roblon server test set-up 1. The results are given in the following tables.

TABLE package width determination

| Server speed setting RPM | Breox 50A50 ® 0.8 wt % (prior art) width (mm) | Breox 50A50 ® 0.8 wt % (prior art) Δwidth (mm) | Stantex ARA ® 0.2 wt % (invention) width (mm) | Stantex ARA ® 0.2 wt % (invention) Δwidth (mm) | relative Δwidth decrease (%) |
|---|---|---|---|---|---|
| 0 (start) | 198.50 | 0 | 196.00 | 0 | |
| 146 | 198.80 | 0.30 | 196.20 | 0.20 | 33 |
| 160 | 200.10 | 1.60 | 196.20 | 0.20 | 88 |
| 176 | 203.2 | 4.70 | 196.20 | 0.20 | 96 |
| 190 | 208.00 | 9.50 | 196.20 | 0.20 | 98 |
| 204 | MAX* | MAX* | 196.20 | 0.20 | NAN* |
| 218 | MAX* | MAX* | 196.80 | 0.80 | NAN* |
| 232 | MAX* | MAX* | 197.40 | 1.40 | NAN* |
| 250 | MAX* | MAX* | 200.10 | 4.10 | NAN* |
| 264 | MAX* | MAX* | 204.40 | 8.40 | NAN* |
| 278 | MAX* | MAX* | MAX* | MAX* | NAN* |

MAX*: maximum package deformation of 20 mm was reached, safety stop activated,
NAN*: relative Δwidth decrease can not be calculated

TABLE

Package angular rotation

| Server speed setting RPM | Breox 50A50 ® 0.8 wt % (prior art) Rotation (degrees) | Stantex ARA ® 0.2 wt % (invention) Rotation (degrees) | Relative angular rotation decrease (%) |
|---|---|---|---|
| 0 (start) | 0 | 0 | |
| 146 | 0 | 0 | |
| 160 | 5 | 0 | 100 |
| 176 | 30 | 0 | 100 |
| 190 | 75 | 0 | 100 |
| 204 | —* | 0 | NAN* |
| 218 | —* | 0 | NAN* |
| 232 | —* | 0 | NAN* |
| 250 | —* | 15 | NAN* |
| 264 | —* | 30 | NAN* |
| 278 | —* | 120 | NAN* |

*maximum package deformation of 20 mm was reached, safety stop activated,
NAN*: relative decrease in angular rotation can not be calculated

TABLE package width determination

| Server speed setting RPM | Breox 50A50 ® 0.8 wt % (prior art) width (mm) | Breox 50A50 ® 0.8 wt % (prior art) Δwidth (mm) | Stantex ARA ® 0.4 wt % (invention) width (mm) | Stantex ARA ® 0.4 wt % (invention) Δwidth (mm) | relative Δwidth decrease (%) |
|---|---|---|---|---|---|
| 0 (start) | 196.00 | 0 | 194.00 | 0 | |
| 146 | 197.20 | 1.20 | 194.00 | 0 | 100 |
| 160 | 198.10 | 2.10 | 194.00 | 0 | 100 |
| 176 | 201.10 | 5.10 | 194.00 | 0 | 100 |
| 190 | 205.30 | 9.30 | 194.00 | 0 | 100 |
| 204 | 210.50 | 14.50 | 194.00 | 0 | 100 |
| 218 | MAX* | MAX* | 194.00 | 0 | NAN*: |
| 232 | MAX* | MAX* | 194.00 | 0 | NAN*: |
| 250 | MAX* | MAX* | 194.00 | 0 | NAN*: |
| 264 | MAX* | MAX* | 194.00 | 0 | NAN*: |
| 278 | MAX* | MAX* | 194.00 | 0 | NAN*: |
| 292 | MAX* | MAX* | 194.00 | 0 | NAN*: |

MAX*: maximum package deformation of 20 mm was reached, safety stop activated,
NAN*: relative Δwidth decrease can not be calculated

TABLE

Package angular rotation

| Server speed setting RPM | Breox 50A50 ® 0.8 wt % (prior art) Rotation (degrees) | Stantex ARA ® 0.4 wt % (invention) Rotation (degrees) | Relative angular rotation decrease (%) |
|---|---|---|---|
| 0 (start) | 0 | 0 | |
| 146 | 0 | 0 | 0 |
| 160 | 0 | 0 | 0 |
| 176 | 5 | 0 | 100 |
| 190 | 20 | 0 | 100 |
| 204 | 65 | 0 | 100 |
| 218 | 160 | 0 | 100 |
| 232 | —* | 0 | NAN* |
| 250 | —* | 0 | NAN* |
| 264 | —* | 0 | NAN* |
| 278 | —* | 0 | NAN* |
| 292 | —* | 0 | NAN* |

*maximum package deformation of 20 mm was reached, safety stop activated,
NAN*: relative decrease in angular rotation can not be calculated

EXAMPLE 3

A finish stock solution based on Stantex ARA® (10 wt %) was made by diluting Stantex ARA® (56 wt %; ex Pulcra) into a 10% solution in warm (40° C.) demi-water. To obtain the final spin finish solution (2.8 wt %) the Stantex ARA® stock solution was further diluted in warm demi-water (40° C.) and stirred for 15 minutes, after which it was ready to apply onto the yarn. Unfinished Twaron® multifilament yarn with a linear density of 2680 dtex and filament count 2000 produced in a single spinning trial at a spinning speed of 320 m/min and treated in-line with Stantex ARA® finish at a dosing level of 0.4 wt % using a kiss roll. The reference yarn sample was finished subsequently under the exact same spinning conditions with Breox 50A50® finish (consisting of random exthoxylated and propylated butanol, ex Ilco-Chemie, BASF) at 0.80 wt %. All samples are wound on a 216 mm length tube with an outer diameter of 106 mm using a precision winder. The weight of the yarn packages and tube was 7 kg for both the reference sample with Breox 50A50® and the sample with Stantex ARA®. The density of the yarn packages was the same for the sample with Breox 50A50® and the sample with Stantex ARA®.

Package stability was measured according the above described Roblon server test set-up 1. The results are given in the following tables.

EXAMPLE 4

Two samples produced under the exact same conditions as described under example 3, one with Breox 50A50® and one sample with Stantex ARA® underwent a static package stability test at a fixed rotation speed as described above. The maximum server rotation speed in the static package stability test is 250 RPM for sample with Stantex ARA® whereas the maximum server rotation speed for the sample with Breox 50A50® is 176 RPM. So an increase of 42% in server rotation speed is found for the sample with Stantex ARA® over the sample with Breox 50A50®.

EXAMPLE 5

Two series of three Twaron multifilament yarn with a linear density of 2680 dtex and a filament count of 2000 produced under the exact same conditions as under example 3, one series with Breox 50A50® and one series with Stantex ARA® are unwound to form one bundle of Twaron multifilament yarn with a linear density of 8050 dtex and a filament count of 6000. This yarn is subsequently wound on a 290 mm length tube with an outer diameter of 106 mm using a precision winder. The weight of the yarn package and tube was 10.8 kg for both samples.

Package stability was measured according the above described Roblon server test set-up 1. The results are given in the following tables.

TABLE 5 package width determination

| Server speed setting RPM | Breox 50A50 ® 0.8 wt % (prior art) | | Stantex ARA ® 0.4 wt % (invention) | | relative Δwidth decrease (%) |
|---|---|---|---|---|---|
| | width (mm) | Δwidth (mm) | width (mm) | Δwidth (mm) | |
| 0 (start) | 266.30 | 0 | 268.90 | 0 | |
| 146 | 267.10 | 0.80 | 269.00 | 0.10 | 86 |
| 160 | 268.00 | 1.70 | 269.00 | 0.10 | 94 |
| 176 | 269.00 | 2.70 | 269.00 | 0.10 | 96 |
| 190 | 271.20 | 4.90 | 269.00 | 0.10 | 98 |
| 204 | 276.20 | 9.90 | 269.00 | 0.10 | 99 |
| 218 | MAX* | MAX* | 269.40 | 0.50 | NAN* |
| 232 | MAX* | MAX* | 269.50 | 0.60 | NAN* |
| 250 | MAX* | MAX* | 270.50 | 1.60 | NAN* |
| 264 | MAX* | MAX* | 275.60 | 6.70 | NAN* |

MAX*: maximum package deformation of 20 mm was reached, safety stop activated,
NAN*: relative Δwidth decrease can not be calculated

TABLE

Package angular rotation

| Server speed setting RPM | Breox 50A50 ® 0.8 wt % (prior art) Rotation (degrees) | Stantex ARA ® 0.4 wt % (invention) Rotation (degrees) | Relative angular rotation decrease (%) |
|---|---|---|---|
| 0 (start) | 0 | 0 | |
| 146 | 0 | 0 | 100 |
| 160 | 5 | 0 | 100 |
| 176 | 10 | 0 | 100 |
| 190 | 30 | 0 | 100 |
| 204 | 65 | 0 | 100 |
| 218 | —* | 5 | NAN* |
| 232 | —* | 10 | NAN* |
| 250 | —* | 30 | NAN* |
| 264 | —* | 60 | NAN* |

*maximum package deformation of 20 mm was reached, safety stop activated,
NAN*: relative decrease in angular rotation can not be calculated

The invention claimed is:

1. A method for stranding aramid yarn around an endless core, the method comprising:
providing the endless core to a stranding apparatus comprising at least one yarn bobbin,
wherein the bobbin revolves around its own axis and the bobbin revolves around the core during operation of the stranding apparatus; and
stranding the yarn around the core at a speed of more than 190 RPM by unwinding the yarn from the bobbin and surrounding the core with the yarn,
wherein the yarn is a continuous aramid yarn provided with 0.05 to 0.95 wt %, based on the weight of the aramid, of a finish substantially free of fatty acid esters and comprising an organophosphorus compound;
wherein
the continuous aramid yarn comprises continuous filaments,
the organophosphorus compound is a compound of the formula X1X2X3P=O or a dimer thereof;
X1, X2, and X3 are independently selected from the group consisting of Y1-, Y1-O—, and M-O;
Y1 is a branched or straight-chain C1-C20 alkyl, aryl or alkenyl;
M is Li, Na, K, or ammonium; and
at least one of X1, X2, or X3 is Y1- or Y1-O—, and the different types of Y1 are the same or different, and
the organophosphorus compound comprises:
a monoalkyl ester of phosphoric acid;
a dialkyl ester of phosphoric acid; and
a dialkyl ester of pyrophosphoric acid.

2. The method according to claim 1, wherein
the organophosphorus compound comprises a phosphine oxide according to formula 1 below:

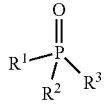

(formula 1)

wherein R1, R2 and R3 are each independently a branched or a straight-chain $C_1$-$C_{20}$ alkyl, aryl or alkenyl.

3. The method according to claim 1, wherein:
the monoalkyl ester of phosphoric acid and the dialkyl ester of phosphoric acid have the formula:

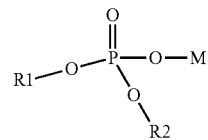

wherein
R1 is a branched or straight-chain $C_1$-$C_{15}$ alkyl,
R2 is H, Li, Na, K or $NH_4$ in the case of the monoalkyl ester of phosphoric acid, or a branched or straight-chain $C_1$-$C_{15}$ alkyl in the case of the dialkyl ester of phosphoric acid, and
M is Li, Na, K or $NH_4$.

4. The method according to claim 1, wherein Y1 is a straight-chain C1-C20 alkyl, aryl or alkenyl.

5. The method according to claim 3, wherein:
the dialkyl ester of pyrophosphoric acid has the formula:

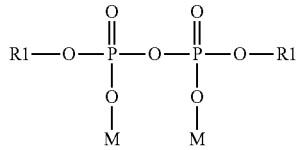

wherein
M is Li, Na, K or ammonium; and
R1 is a branched or straight-chain $C_1$-$C_{15}$ alkyl, and
the finish comprises up to 30 wt % of the dialkyl ester of pyrophosphoric acid.

6. The method according to claim 1, wherein the aramid is poly(p-phenylene terephthalamide) or poly(p-phenylene terephthalamide) containing 3,4'-diaminodiphenylether and 5(6)-amino-2-(p-aminophenyl)benzimidazole units.

7. The method according to claim 1, wherein the stranding apparatus includes at least two yarn bobbins that revolve around the core.

8. The method according to claim 1, wherein the aramid is applied with a lay length in the range of 100 to 500 mm.

9. The method according to claim 1, wherein the core comprises one or more optical glass fibers such that stranding the yarn around the core produces an optical fiber cable.

10. The method according to claim 1, further comprising:
an extruding step after the stranding step, wherein
a sheathing of a polymer material is extruded around the core provided with strands of aramid yarn.

11. The method according to claim 9, wherein the core further comprises a sheathing of a thermoplastic material that surrounds the optical glass fibers.

12. The method according to claim 1, wherein:
the organophosphorus compound further comprises a phosphinate according to formula 2 below:

(formula 2)

wherein R1 is a branched or straight-chain $C_1$-$C_{20}$ alkyl, aryl or alkenyl, Li, Na, K or $NH_4$; and
R2 and R3 are each independently a branched or straight-chain $C_1$-$C_{20}$ alkyl, aryl or alkenyl.

13. The method according to claim 1, wherein:
the organophosphorus compound further comprises a phosphonate according to formula 3 below:

(formula 3)

wherein R1 and R2 are each independently a branched or straight-chain $C_1$-$C_{20}$ alkyl, aryl or alkenyl, Li, Na, K or $NH_4$; and
R3 is a branched or straight-chain $C_1$-$C_{20}$ alkyl, aryl or alkenyl.

14. The method according to claim 1, wherein:
the organophosphorus compound comprises a phosphate ester according to formula 4 below:

(formula 4)

R1 is a branched or straight-chain $C_1$-$C_{20}$ alkyl, aryl, alkenyl; and
R2 and R3 are each independently H, Li, Na, K or $NH_4$, or a branched or straight-chain $C_1$-$C_{20}$ alkyl, aryl, or alkenyl.

15. The method according to claim 1, wherein the organophosphorus compound consists of:
a monoalkyl ester of phosphoric acid;
a dialkyl ester of phosphoric acid;
a dialkyl ester of pyrophosphoric acid; and
optionally, a trialkyl ester of phosphoric acid.

16. The method according to claim 15, wherein the solid components of the finish consist of the organophosphorus compound.

17. The method according to claim 1, wherein the stranding step is operated at a speed of at least 200 RPM.

18. The method according to claim 1, wherein the stranding step is operated at a speed of at least 205 RPM.

19. A method for stranding aramid yarn around an endless core, the method comprising:
providing the endless core to a stranding apparatus comprising at least one yarn bobbin,
wherein the bobbin revolves around its own axis and the bobbin revolves around the core during operation of the stranding apparatus; and
stranding the yarn around the core at a speed of more than 190 RPM by unwinding the yarn from the bobbin and surrounding the core with the yarn,
wherein the yarn is a continuous aramid yarn provided with 0.05 to 0.95 wt %, based on the weight of the aramid, of a finish substantially free of fatty acid esters and comprising an organophosphorus compound;
wherein
the continuous aramid yarn comprises continuous filaments,
the organophosphorus compound is a compound of the formula X1X2X3P=O or a dimer thereof;
X1, X2, and X3 are independently selected from the group consisting of Y1-, Y1-O—, and M-O;
Y1 is a branched or straight-chain C1-C20 alkyl, aryl or alkenyl;
M is Li, Na, K, or ammonium; and
at least one of X1, X2, or X3 is Y1- or Y1-O—, and the different types of Y1 are the same or different, and
the organophosphorus compound comprises:
a monoalkyl ester of phosphoric acid;
a dialkyl ester of phosphoric acid; and
a trialkyl ester of phosphoric acid.

20. The method according to claim 19, wherein:
the trialkyl ester of phosphoric acid has the formula:

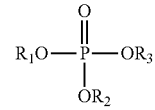

and $R_1$, $R_2$ and $R_3$ are each independently a branched or straight-chain $C_1$-$C_{15}$ alkyl groups, and
the finish comprises up to 20 wt % of the trialkyl ester of phosphoric acid.

21. The method according to claim 19, wherein the organophosphorus compound consists of:
a monoalkyl ester of phosphoric acid;
a dialkyl ester of phosphoric acid;
a trialkyl ester of phosphoric acid; and
optionally, a dialkyl ester of pyrophosphoric acid.

22. The method according to claim 21, wherein the solid components of the finish consist of the organophosphorus compound.

23. The method according to claim 19, wherein the stranding step is operated at a speed of at least 200 RPM.

24. The method according to claim 19, wherein the stranding step is operated at a speed of at least 205 RPM.

* * * * *